United States Patent [19]

Schram

[11] 4,397,421
[45] Aug. 9, 1983

[54] METHOD AND MEANS FOR APPLYING CHEMICALS TO A FIELD

[76] Inventor: Daniel R. Schram, Rte. 2, Stratton, Nebr. 69043

[21] Appl. No.: 291,436

[22] Filed: Aug. 10, 1981

[51] Int. Cl.³ ............................................... B05B 3/00
[52] U.S. Cl. ..................................... 239/177 R; 239/170; 239/710
[58] Field of Search ............... 239/177, 709, 710, 161, 239/163, 170, 450, 562, 565

[56] References Cited

U.S. PATENT DOCUMENTS

| | | | |
|---|---|---|---|
| 3,648,930 | 3/1972 | Brown et al. | 239/177 X |
| 3,826,431 | 7/1974 | Telge | 239/170 X |

Primary Examiner—John J. Love
Assistant Examiner—Mary McCarthy
Attorney, Agent, or Firm—Zarley, McKee, Thomte, Voorhees & Sease

[57] ABSTRACT

A liquid chemical spraying apparatus is described whereby liquid chemical may be applied to a field by utilizing a center pivot irrigation system. The center pivot irrigation system comprises a water supply pipe which is movable about a center pivot and which is supported by a plurality of spaced-apart drive towers for propelling the supply pipe around the center pivot. Each of the drive towers includes an electric drive which is responsive to an alignment control to maintain the supply pipe in an aligned condition as it travels about the center pivot. The spraying apparatus is vertically movably supported from the supply pipe or the truss system supporting the pipe. The spraying apparatus comprises a main supply line which is in communication with a source of liquid chemical. First and second applicator lines are in fluid communication with the main supply line. A control valve is positioned between the main supply line and the applicator lines at each of the drive towers and is operatively connected to the alignment control for the drive tower so that chemical will be supplied from the main supply line to the applicator lines only when the associated drive tower is being driven. Manually operated selector valves are positioned between the main supply line control valve and the applicator lines so that chemical may be selectively supplied to either or both of the applicator lines. A plurality of spaced-apart spray nozzles are provided on each of the applicator lines for spraying the chemical on the area beneath the irrigation system. The source of chemical, main supply line and applicator lines are fluidly isolated from the water in the water supply pipe to prevent contamination of the source of water. The chemical may be sprayed on to the area in conjunction with or apart from the application of water to the field.

5 Claims, 6 Drawing Figures

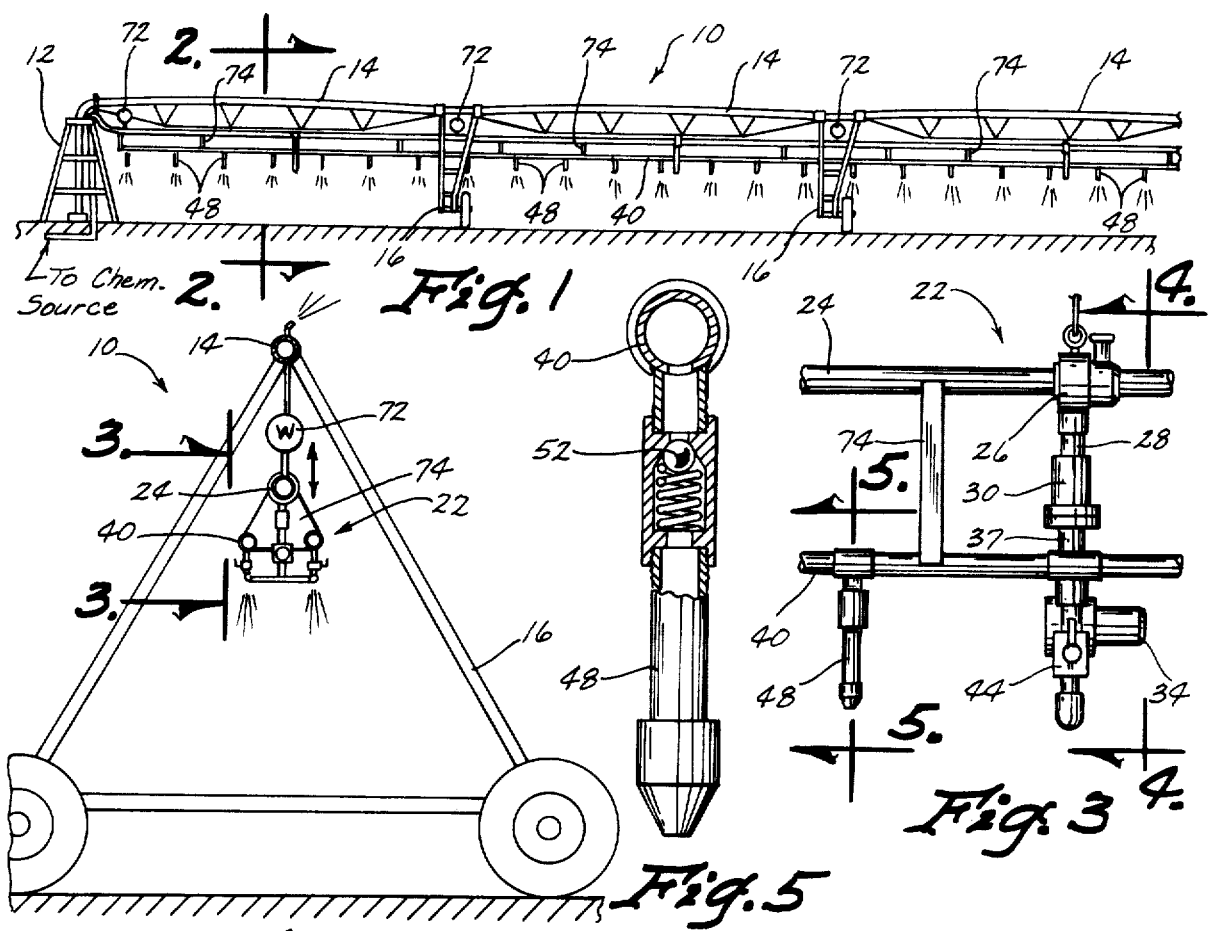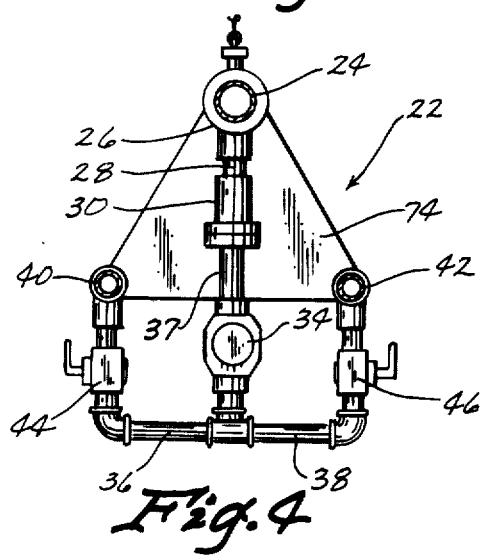

METHOD AND MEANS FOR APPLYING CHEMICALS TO A FIELD

BACKGROUND OF THE INVENTION

This invention relates to a chemical spraying apparatus and more particularly to an apparatus which is mounted on a center pivot irrigation system. It has long been recognized that it is desirable to apply liquid chemicals on to a field through a center pivot sprinkling system. Ordinarily, the chemicals are injected into the water passing through the main supply pipe for distribution to the field through the water as the main supply pipe is moved around the pivot by the drive towers. A serious problem with contamination of the water source is sometimes experienced should the safety equipment fail. In some situations, the water having chemicals therein has siphoned or flowed back into the well which results in a contamination of the water in the well and the surrounding area.

Another problem experienced with the application of liquid chemicals in conjunction with the irrigation water is that the water tends to diminish the affects of the chemicals since the chemicals are washed from the leaves of the plants.

Therefore, it is a principal object of the invention to provide a liquid chemical spraying apparatus which is mounted on a center pivot sprinkling system.

A still further object of the invention is to provide a chemical spraying apparatus mounted on the drive towers of a center pivot system wherein the chemicals are fluidly isolated from the source of water.

A still further object of the invention is to provide a method and means of applying chemicals to a field wherein the application rate of the chemicals may be easily varied.

A still further object of the invention is to provide an apparatus for spraying chemicals on a field which is vertically movably mounted on a center pivot system.

A still further object of the invention is to provide a chemical spraying apparatus mounted on a center pivot system and operatively connected thereto so that the chemicals are applied to the field in response to movement of the drive towers.

These and other objects will be apparent to those skilled in the art.

BRIEF DESCRIPTION OF THE DRAWINGS

FIG. 1 is an elevational view illustrating a conventional pivot irrigation system having the apparatus of this invention mounted thereon:

FIG. 2 is an enlarged sectional view seen on lines 2—2 of FIG. 1:

FIG. 3 is an enlarged sectional view seen on lines 3—3 of FIG. 2:

FIG. 4 is a sectional view seen on lines 4—4 of FIG. 3:

FIG. 5 is an enlarged partial sectional view seen on lines 5—5 of FIG. 3; and

DESCRIPTION OF THE PREFERRED EMBODIMENT

Figure 6:
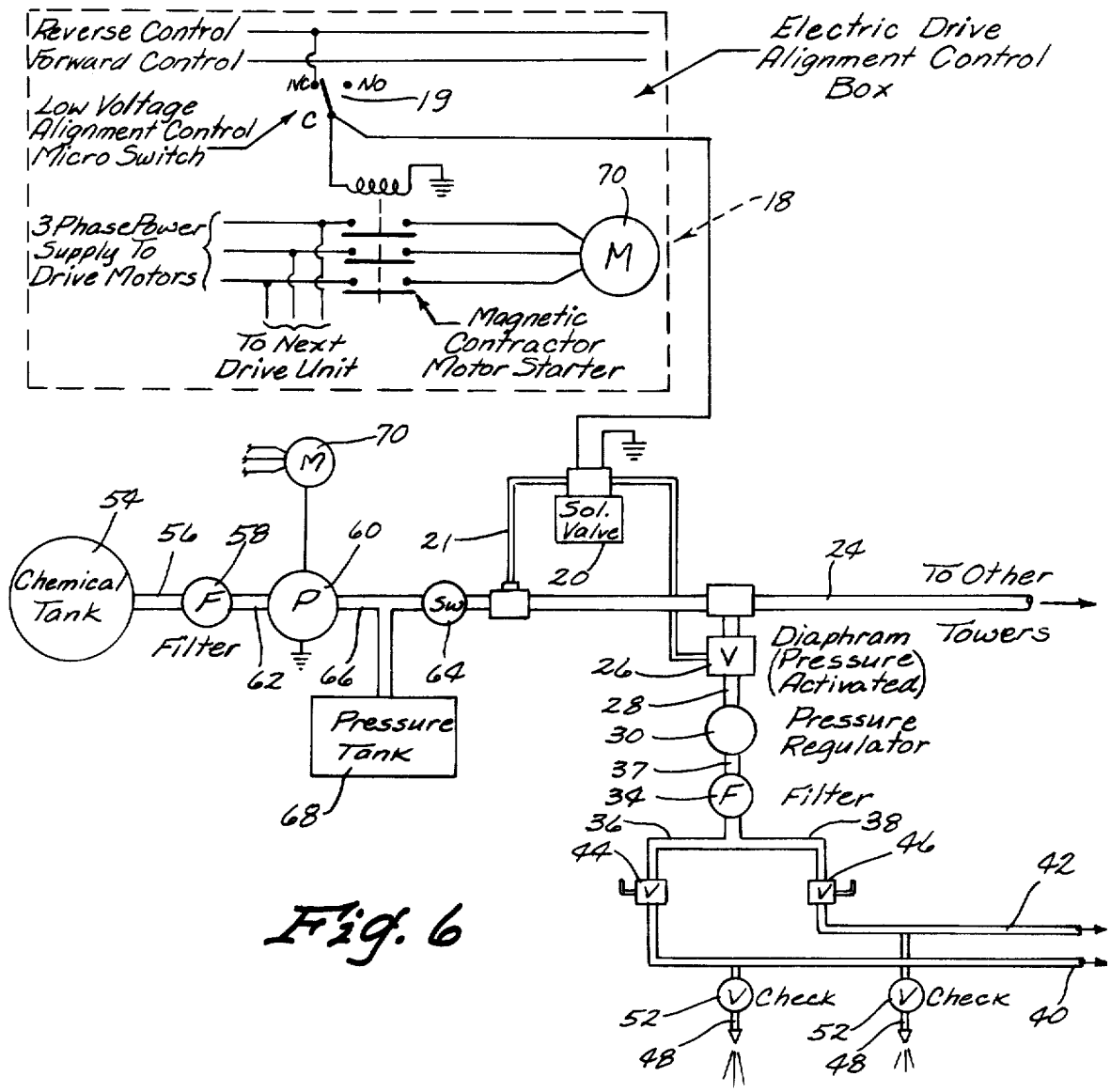
FIG. 6 is a schematic of the circuitry of the invention.

Referring to FIG. 1, the numeral 10 generally designates a conventional center pivot irrigation system. System 10 includes a center pivot 12 having a water supply pipe 14 extending outwardly therefrom. The pipe 14 is supported by a plurality of spaced-apart drive towers 16. The number of drive towers 16 varies from system to system. Each of the drive towers 16 is independently driven by an electric motor in response to conventional alignment controls thereon. Ordinarily, the outermost drive tower operates continually with the other drive towers being operated intermittently to maintain the supply pipe 14 in an aligned condition as the drive towers move the pipe 14 around the center pivot 12. In the schematic of FIG. 6, the numeral 18 refers to the electric drive alignment control box positioned on each of the towers, except the outermost tower. The alignment control box 18 includes a low voltage alignment control switch 19 operatively connected to drive motor 70. Thus, when the particular drive tower is out of alignment with the other drive towers, the alignment control box 18 causes the drive motor on the drive tower to be energized to propel the drive tower. Switch 19 is also operatively connected to solenoid valve 20 which is imposed in tubing 21 as will be described in more detail hereinafter.

The water supply line 14 is in communication with a pump next to a source of water so that water will be delivered to the length of the pipe 14 for subsequent sprinkler irrigation to the area below the system. It is to this conventional system that the apparatus 22 of this invention is attached. Apparatus 12 includes a main supply line 24 which extends from the center pivot 12 to the outermost drive tower. It is recommended that suitable flexible connections be provided in the pipe 24 at each drive tower since the drive towers are sometimes slightly out of alignment with the other drive towers and since the drive towers may be traversing irregular terrain. A pressure activated diaphragm valve 26 is placed in communication with the line 24 at each tower. Valve 26 is in fluid communication with tubing 21 extending from line 24. Valve 26 is normally closed but is opened when valve 20 permits pressure to be supplied to valve 26. Thus, valves 26 are normally closed but are opened when the switch 19 on the respective tower is actuated. In other words, the valve 26 is only opened when the associated drive tower is being driven. Each of the valves 26 has a pipe or conduit 28 extending therefrom which is in communication with a pressure regulator 30. Pressure regulator 30 has a pipe or conduit 37 extending therefrom which is in communication with a filter 34 designed to remove sediment or sand from the fluid. Filter 34 has a pair of pipes 36 and 38 extending therefrom which communicate with applicator lines 40 and 42 respectively. Manually operated selector valves 44 and 46 are provided in the lines 36 and 38 respectively to permit the selective supply of chemicals to the applicator lines 40 and 42 as will be described in more detail hereinafter. A plurality of spaced-apart spray nozzles 48 are in communication with pipe 40 along the length thereof as best illustrated in the drawing. Likewise, a plurality of horizontally spaced-apart spray nozzles 50 are provided along the length of the applicator line 42. It should be noted that the applicator lines between each of the drive towers are not in communication with the applicator line between other drive towers as will be described in more detail hereinafter.

It should be noted that each of the spray nozzles 48 and 50 includes a one-way check valve 52 as best illustrated in FIG. 5. Check valve 52 prevents chemical in the applicator line from draining therethrough until a sufficient pressure exists in the applicator line.

Referring to FIG. 6, the numeral 54 refers to a source of liquid chemicals having line 56 extending therefrom to a filter 58. Filter 58 is connected to a motor driven pump 60 by line 62. Pump 60 is connected to a pressure switch 64 by line 66. Line 66 is in communication with a pressure tank 68 as indicated.

The main supply line 24 and applicator lines 40 and 42 are preferably suspended from the water supply line 14 by a plurality of winches 72. The winches 72 permit the line 24 and the applicator lines 22 to be vertically moved relative to the system as desired so that the nozzles may be positioned closely adjacent the crop or ground being sprayed to prevent or minimize chemical drift. It should also be noted that the applicator lines 40 and 42 and the supply line 24 may be suspended from the truss system of the irrigation system. It is also recommended that some form of stiffening or strengthening truss work be provided between the lines 24, 40 and 42. One form of such a truss system is illustrated in FIG. 4 and is identified by the reference numeral 74.

The normal method of operation is as follows. The spray apparatus of this invention may be operated completely independently of the irrigation operation. The only requirement is that the drive towers be activated to propel the system around the center pivot. The outermost drive tower would be energized or activated to propel the spray apparatus around the center pivot. As each of the towers 16 is independently driven through actuation of the motor 70 thereon, chemical will be sprayed onto the crop or ground from either or both of the applicator lines 40 and 42. Thus, actuation of the motor 70 by the alignment control box 18 causes solenoid control valve 20 to be opened thereby supplying pressure to valve 26 to open the same which causes chemical flowing through the line 24 to be supplied to the applicator lines 40 and 42 adjacent that particular drive tower. Thus, chemical is sprayed adjacent the drive tower only when that particular drive tower is being driven. It should be noted that the chemical in tubing 21 does not pass through valve 26 but only serves to pressurize the same.

The purpose of having a pair of applicator lines is that it enables a much greater variety of application rates to be achieved. For example, if the spray nozzles connected to applicator line 40 are designed to apply "X" gallons of chemical per hour, and the spray nozzles in communication with applicator line 42 are designed to apply "Y" gallons of chemical per hour, actuation of selector valve 44 permits "X" gallons of chemical to be applied. Similarly, actuation of the valve 46 causes "Y" gallons of chemical to be applied per hour. Actuation of both selector valves 44 and 46 causes "X"+"Y" gallons of chemical to be applied per hour.

Perhaps the single most important aspect of this system is that the chemical flowing through the line 24 is completely insulated from the water source for the irrigation system. Thus, the fact that the chemicals are completely insulated from the source of water prevents any possible contamination of the ground water or the water source.

Although the spraying apparatus has been described as particularly well suited for sprinkling systems such as that of the center pivot type, it should be understood that the apparatus will work equally as well in conjunction with the lateral moving type sprinkling systems.

Thus it can be seen that the apparatus accomplishes at least all of its stated objectives.

I claim:

1. In combination,
  a self-propelled center pivot sprinkling apparatus comprising
  a water supply pipe movable about a center pivot point; a plurality of spaced-apart, wheeled drive towers supporting said supply pipe above the area to be sprinkled; a drive means on each of said towers to propel said towers and said supply pipe about said central pivot point; drive control means on said towers for controlling the operation of said drive means so that said towers will be selectively driven to maintain said supply pipe in an aligned condition as said supply pipe is moved about said central pivot point,
  a liquid chemical spraying apparatus operatively supported by said drive towers and extending outwardly from said central pivot point to the outermost drive tower for spraying chemicals on the area beneath the supply pipe as the drive towers propel said spraying apparatus around said central pivot point,
  a source of liquid chemical in fluid communication with said spraying apparatus,
  said source of liquid chemical and said spraying apparatus being fluidly isolated from the source of water for said sprinkling apparatus and from any water in said supply pipe,
  said spraying apparatus comprising a main supply line extending from said center pivot point outwardly to the outermost drive tower, said main supply line being in fluid communication with said source of liquid chemical,
  said spraying apparatus also comprising first and second applicator lines positioned below said main supply line between each pair of adjacent drive towers, spray nozzles on each of said applicator lines, the applicator lines between each pair of adjacent drive towers being fluidly isolated from the applicator lines between the other drive towers,
  said applicator lines, between adjacent pairs of drive towers, being individually selectively fluidly connected to said main supply line whereby chemical may be selectively supplied to either or both of said applicator lines to permit the amount of applied chemical to be selectively varied.

2. The combination of claim 1 wherein a pressure regulator is provided between said main supply line and the applicator lines between each pair of adjacent drive towers.

3. The combination of claim 1 wherein said main supply line and applicator lines are operatively selectively vertically movably mounted on said drive towers.

4. The combination of claim 1 wherein a normally closed control valve means is positioned between said main supply line and said applicator lines at each of said drive towers, each of said control valve means being operatively connected to the drive control means on the associated tower for opening the said control valve means when said drive tower is being driven.

5. In combination,
  a self-propelled sprinkling apparatus comprising a movable water supply pipe; a plurality of spaced-apart wheeled drive towers supporting said supply pipe above the area to be sprinkled; a drive means on at least some of said towers for propelling said towers and said supply pipe; drive control means for controlling the operation of said drive means, a liquid chemical spraying apparatus operatively supported by said sprinkling apparatus for spraying chemicals on the area beneath the supply pipe as said spraying apparatus is moved over the area to be sprinkled, a source of liquid chemical in fluid communication with said spraying apparatus, said source of liquid chemical and said spraying apparatus being fluidly isolated from the source of water for said sprinkling apparatus and from any water in said supply pipe, said spraying apparatus comprising a main supply line extending the length of the water supply pipe, said main supply line being in fluid communication with said source of liquid chemical, said spraying apparatus also comprising first and second applicator lines positioned below said main supply line between each pair of adjacent drive towers, spray nozzles on each of said applicator lines, the applicator lines between each pair of adjacent drive towers being fluidly isolated from the applicator line between the other drive towers, said applicator lines, between adjacent pairs of drive towers, being individually selectively fluidly connected to said main supply line whereby chemical may be selectively supplied to either or both of said applicator lines to permit the amount of applied chemical to be selectively varied.

* * * * *